United States Patent [19]

Kermarrec

[11] Patent Number: 5,319,154
[45] Date of Patent: Jun. 7, 1994

[54] METHOD OF COOLING A CURRENT FEED FOR VERY LOW TEMPERATURE ELECTRICAL EQUIPMENT AND DEVICE FOR IMPLEMENTING IT

[75] Inventor: Jean-Claude Kermarrec, Veilzy-Villacoublay, France

[73] Assignee: GEC Alsthom SA, Paris, France

[21] Appl. No.: 794,247

[22] Filed: Nov. 19, 1991

[30] Foreign Application Priority Data

Nov. 20, 1990 [FR] France .................. 90 14457

[51] Int. Cl.⁵ .................. H01B 7/34; H01B 12/00
[52] U.S. Cl. .................. 174/15.5; 174/15.1; 174/15.4; 505/885; 505/899; 505/900
[58] Field of Search .................. 174/15.1, 16.1, 15.4, 174/15.5, 125.1; 505/885, 892, 705, 879, 891, 899, 900

[56] References Cited

U.S. PATENT DOCUMENTS

| | | | |
|---|---|---|---|
| 3,522,361 | 7/1970 | Kafka .................. | 174/15.5 |
| 3,764,726 | 10/1973 | Kohler et al. .................. | 505/885 X |
| 3,835,239 | 9/1974 | Schmidt et al. .................. | 505/885 X |
| 3,900,699 | 8/1975 | Penczynksi et al. .................. | 505/885 X |
| 3,959,576 | 5/1976 | Penczynski et al. .................. | 505/885 X |
| 4,209,658 | 6/1980 | Hilal .................. | 174/15.4 |
| 4,369,636 | 1/1983 | Purcell et al. .................. | 174/15.4 X |
| 5,183,965 | 2/1993 | Lawless .................. | 505/885 X |

FOREIGN PATENT DOCUMENTS 0121194 10/1984 European Pat. Off.
0157009 12/1981 Japan .................. 174/15.4

Primary Examiner—Leo P. Picard
Assistant Examiner—Hyung S. Sough
Attorney, Agent, or Firm—Sughrue, Mion, Zinn, Macpeak & Seas

[57] ABSTRACT

A current feed extends between a terminal at ambient temperature and an electrical equipment immersed in a cryogenic fluid and adapted to operate at variable current. The current feed is cooled by circulating an auxiliary cooling fluid at ambient temperature exchanging heat with the current feed. The auxiliary cooling fluid is introduced at an intermediate level of the current feed when the current exceeds a particular threshold and optionally all or some of the auxiliary cooling fluid is introduced at other levels nearer the electrical equipment at higher currents.

1 Claim, 4 Drawing Sheets

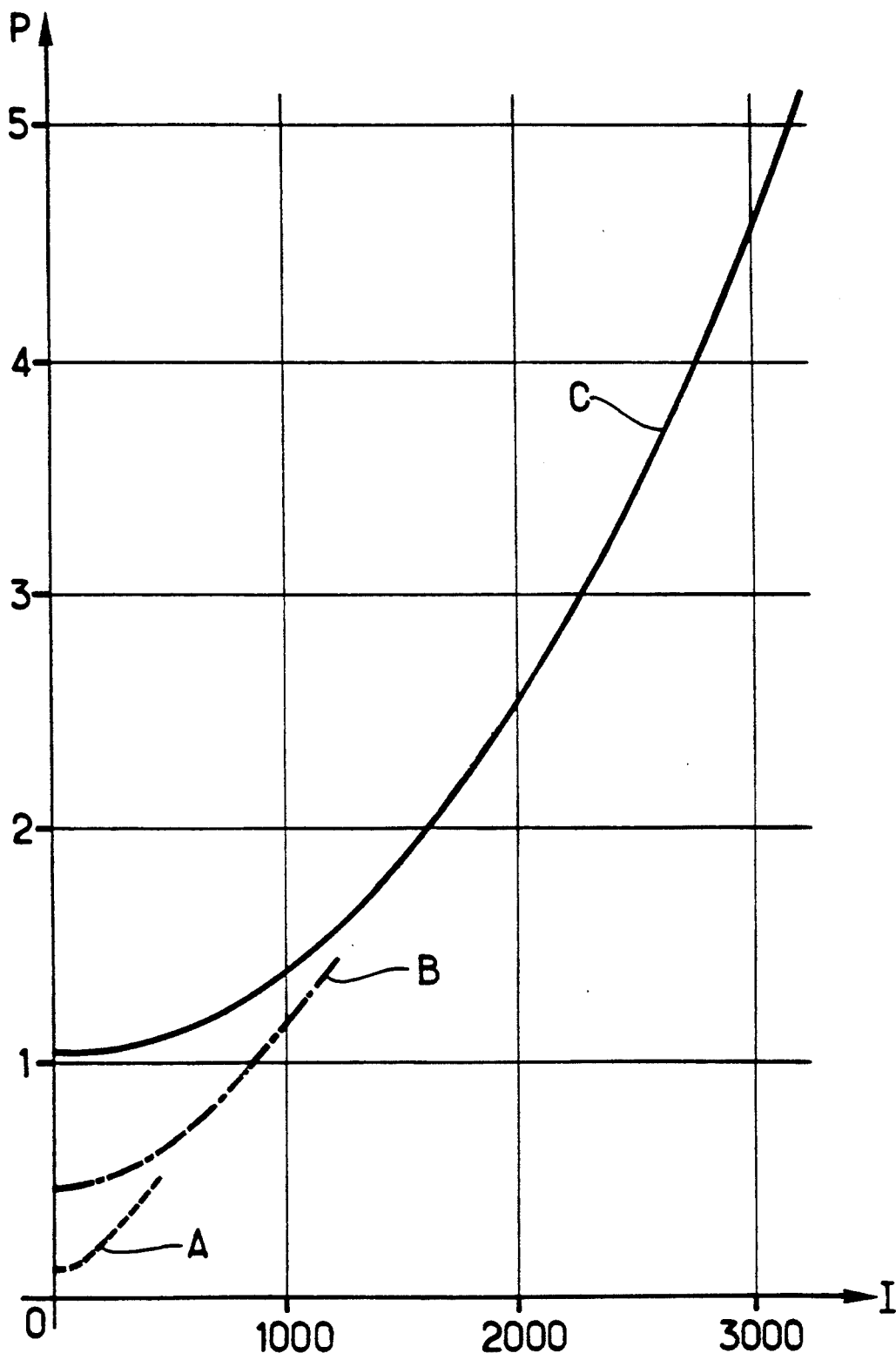

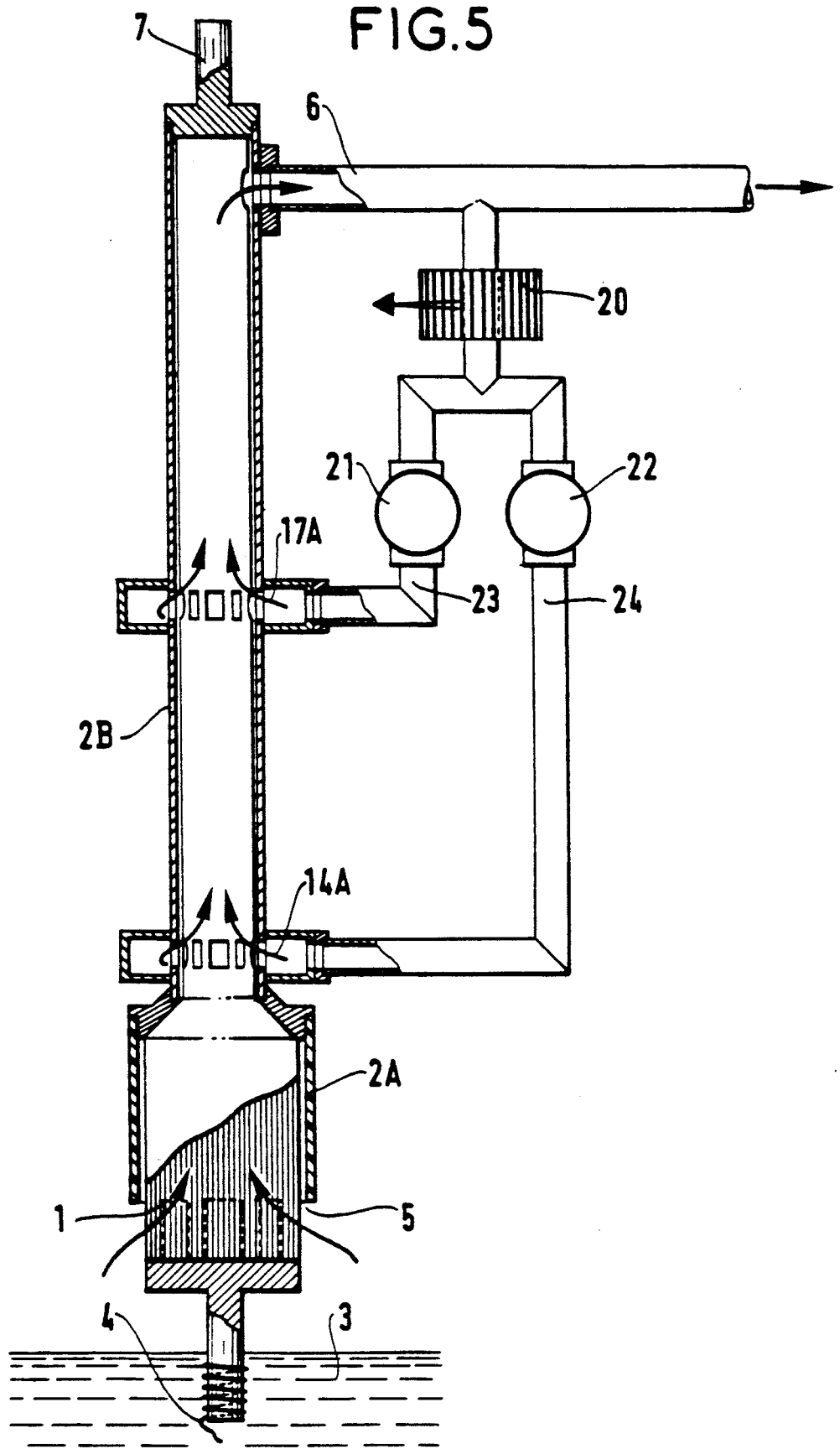

METHOD OF COOLING A CURRENT FEED FOR VERY LOW TEMPERATURE ELECTRICAL EQUIPMENT AND DEVICE FOR IMPLEMENTING IT

BACKGROUND OF THE INVENTION

1. Field of the Invention

The present invention concerns a method of cooling a current feed between a terminal at ambient temperature and an electrical equipment operating at very low temperature and at variable current. This method exchanges heat between the current feed and an auxiliary cooling fluid. This auxiliary fluid is injected at ambient temperature at a point between the terminal at ambient temperature and the electrical equipment. The fluid outlet is at the terminal at ambient temperature. The invention also includes a device for implementing this method.

The invention applies in particular to cooling superconductive equipment, especially superconductive machines, operating at different times with no or only a low current, with a nominal current and with a current greater than the nominal current.

Current feeds of this kind connect an external circuit operating in an ambient temperature environment to the very low temperature electrical equipment, immersed in liquid helium at 4.2K or in liquid nitrogen at 77K, for example. They are subject to losses as a result of the Joule effect and by thermal conduction; these losses introduce an additional liquefaction-refrigeration overhead as compared with that for cooling the very low temperature equipment.

It is known that the liquefaction-refrigeration requirements balance (cryogenic balance) is improved when the current feeds are cooled by exchange of heat with an fluid injected in contact with them at low temperature, evacuated at ambient temperature and then cooled by the cryogenic machine cooling the equipment. The cryogenic fluid is usually evaporated by the current feed itself, which is then said to be "self-cooled". Under these conditions, it is known that the heat losses for a given current are minimal when the ratio $$r = \frac{IL}{S}$$

(where L and S designate the length and the transverse cross-section of the conductor) has an optimal value $r_{opt}$ depending only on the nature of the conductive material. In the case of a current feed whose transverse cross-section S(1) is not constant over the entire length of the conductor an analogous law is obtained:

$$r = I \int_o^L \frac{dl}{S(l)}$$

The definition of the current feed showing minimal losses therefore depends on the current I that it carries. In particular, a current feed optimized for a given current $I_l$ has non-negligible losses under no load conditions (approximately 50% of the full load losses) and may even be destroyed in the event of an overload for a current varying from 1.05 $I_l$ to 3 $I_l$ depending on its structure and the conductive material used.

It is therefore advantageous to modify the current feed according to the current I that it must carry in such a way as to maintain the above ratio r as close as possible to the value $r_{opt}$.

A first proposal is mechanically to unplug the current feed when the electrical equipment is shut down. This makes it possible to reduce considerably the losses under no load conditions, but introduces problems of reliability and of contact resistance, and in the event of automated operation requires a complex control system and the provision of adequate room to maneuver. The current feed is then optimized only for a single value of current, unless it is subdivided into a plurality of individually unpluggable elements that are thermally insulated from each other, resulting in a very complex installation.

Another proposal is that the electrical contacts should be transferable between an over-dimensioned conductor at a temperature near ambient temperature and the current feed proper (a so-called "sliding" contact) so as to vary the useful length 1 such that its value remains close to the product $r_{opt}.s/I$. This solution introduces problems of reliability, of electrical resistance and of effective sealing. It requires a large amount of room to maneuver above the cryostat and flexible or articulated conductors, and is therefore hardly feasible for use in a confined space.

Finally, the document U.S. Pat. No. 4 209 658 proposes a method of optimizing a current feed in which the point of the feed maintained at ambient temperature is moved by sliding in a bore internal to the feed a piston delimiting the extreme point that can be reached by cooling water introduced into the bore, so as to vary the length of the current feed below ambient temperature in inverse proportion to the current. A method of this kind has the same drawbacks as mentioned above except that concerning the contact resistance.

An object of the present invention is to optimize the current feed for a plurality of current values, for example a null or low value (operation of the very low temperature electrical equipment with no load), a value representing nominal operation and a value representing a temporary overload of the electrical equipment (starting).

SUMMARY OF THE INVENTION

The invention consists in a method of cooling a current feed between a terminal at ambient temperature and an electrical equipment immersed in a cryogenic fluid, the equipment being adapted to operate at variable current, the cooling being obtained by circulating an auxiliary cooling fluid at ambient temperature exchanging heat with the current feed, in which method the auxiliary cooling fluid is introduced at an intermediate level of the current feed when the current exceeds a particular threshold and optionally all or some of the auxiliary cooling fluid is introduced at other levels nearer the electrical equipment at higher currents.

The invention further consists of a device for cooling a current feed between a terminal at ambient temperature and an electrical equipment immersed in a cryogenic fluid, the equipment being adapted to operate at variable current, the cooling being obtained by circulating an auxiliary cooling fluid at ambient temperature exchanging heat with the current feed, by a method in which the auxiliary cooling fluid is introduced at an intermediate level of the current feed when the current exceeds a particular threshold and optionally all or some of the auxiliary cooling fluid is introduced at other levels nearer the electrical equipment at higher currents, said device comprising a first enclosure around said current feed and delimiting a first passage for circulation of said auxiliary cooling fluid in thermal contact with said current feed and means for admitting all or some of said cooling fluid into said first passage at a level selected according to the current from one or more possible levels.

The invention further consists of a device for cooling a current feed between a terminal at ambient temperature and an electrical equipment immersed in a cryogenic fluid, the equipment being adapted to operate at variable current, the cooling being obtained by circulating an auxiliary cooling fluid at ambient temperature exchanging heat with the current feed, by a method in which the auxiliary cooling fluid is introduced at an intermediate level of the current feed when the current exceeds a particular threshold and optionally all or some of the auxiliary cooling fluid at other levels nearer the electrical equipment at higher currents, said device comprising a heat-exchanger for cooling to ambient temperature cryogenic fluid vapor heated by exchanging heat with said current feed and means for recirculating cryogenic fluid vapor in direct contact with the conductor of said current feed at a level chosen according to the current from one or more possible levels.

Methods and devices for cooling current feeds of superconductive electrical equipment for railroad traction operating in a bath of cryogenic fluid are described hereinafter by way of example and with reference to the appended drawings.

BRIEF DESCRIPTION OF THE DRAWINGS

FIG. 4 is a set of curves showing as a function of current the cryogenic consumption of a current feed cooled by ambient air as a function of the cooled areas of the current feed.

FIG. 5 shows in diametral cross-section a device in which the cooling fluid is the gaseous cryogenic fluid previously heated by exchange of heat with the current feed and then cooled by exchange of heat with the atmosphere.

DETAILED DESCRIPTION OF THE INVENTION

Figure 1:
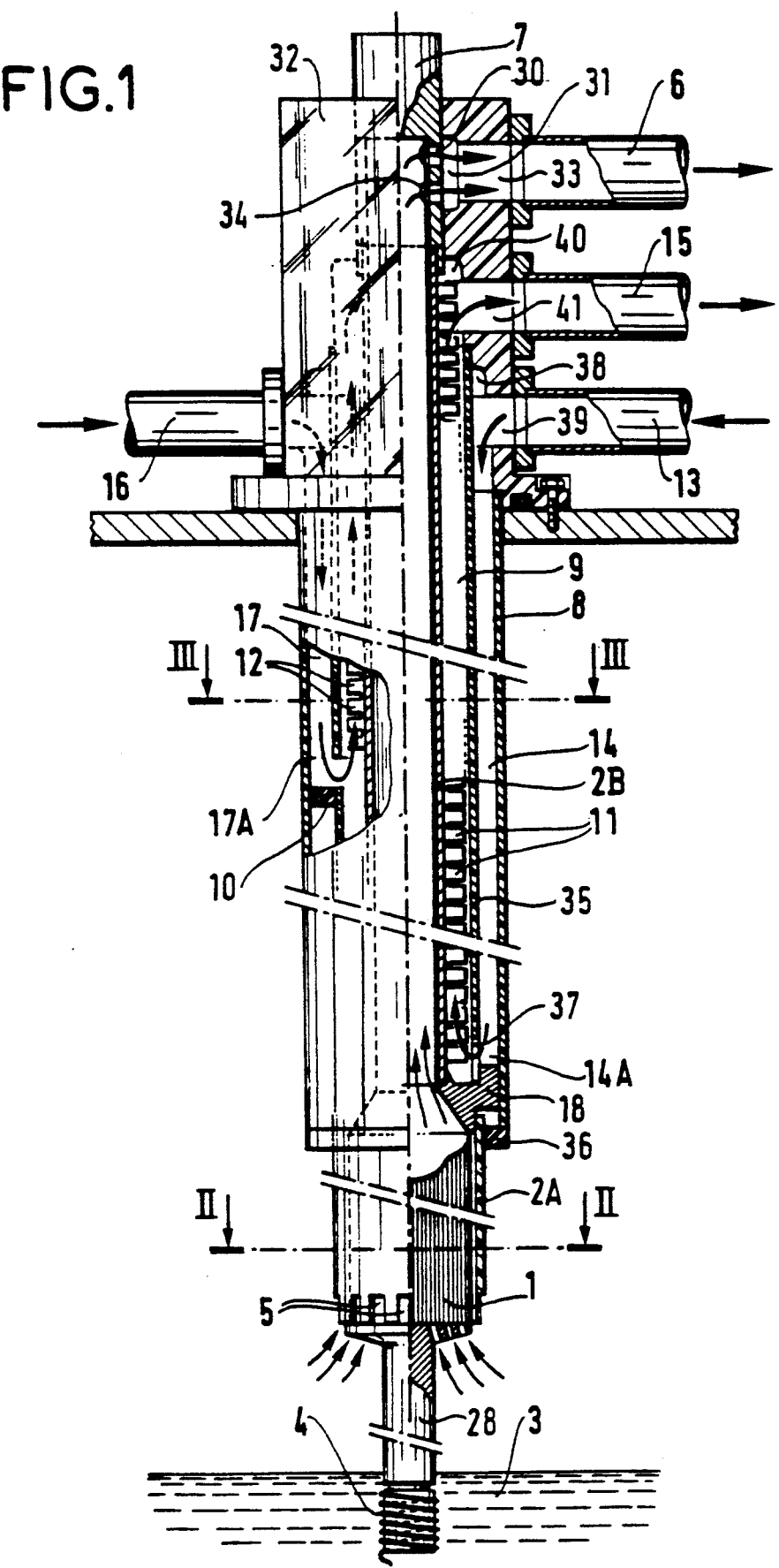
FIG. 1 shows in elevation and in diametral cross-section a device in which the auxiliary cooling fluid is air at ambient temperature.
Figure 2:
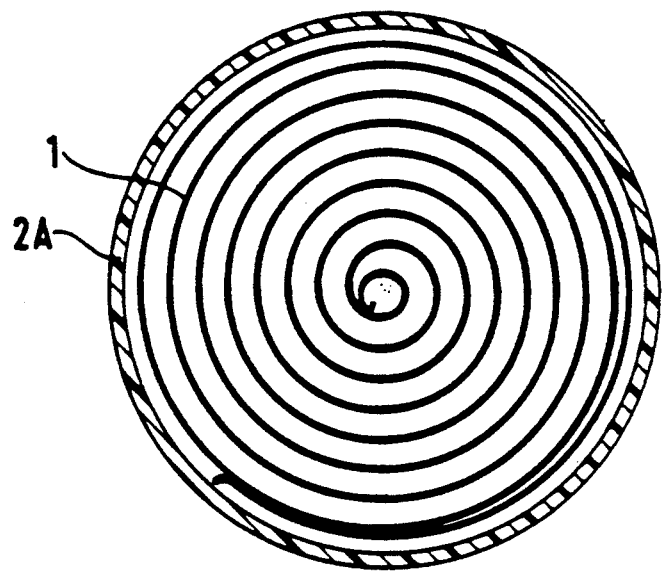
FIG. 2 is a transverse cross-section on the line II—II in FIG. 1.
Figure 3:
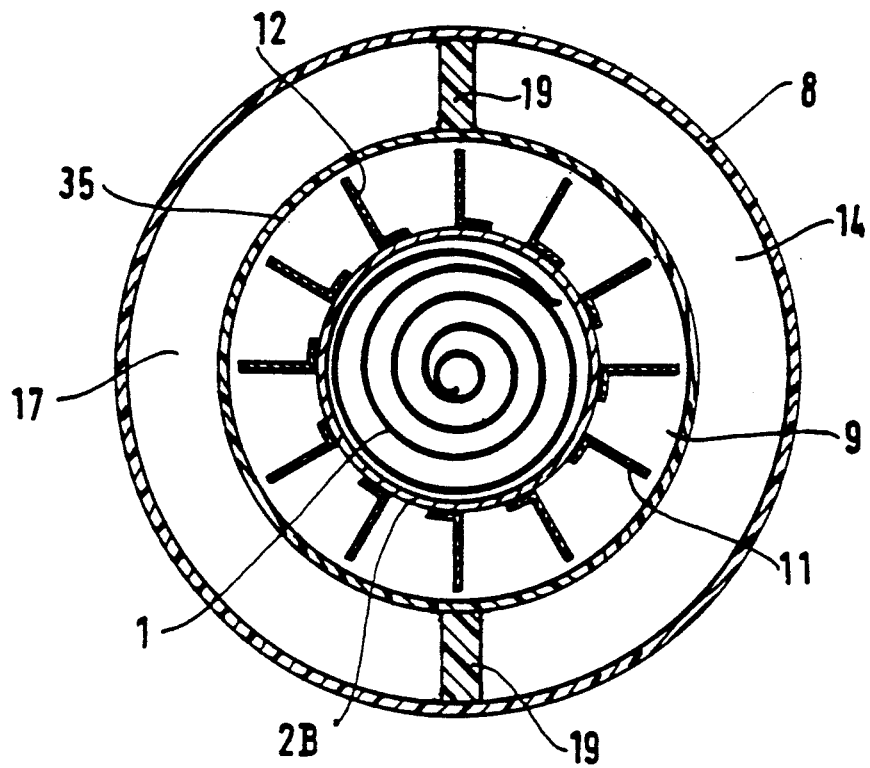
FIG. 3 is a transverse cross-section on the line III—III in FIG. 1.

In FIGS. 1 to 3 the conductor 1 of the current feed is a thin strip wound into a spiral and having a large developed surface area. It is made from brass or a material having a comparable electrical resistivity (approximately $3.10^{-8}$ ohm.m) at low temperature. Before it is shaped into the spiral the strip has an L-shape cross-section whose horizontal branch has an oblique upper edge, so that the spiral-wound strip has the shape shown in FIG. 1.

The strip is contained in a sealed tube comprising two parts 2A and 2B and inside which can circulate cryogenic fluid vapor resulting from evaporation at the surface of the bath of cryogenic fluid 3 due to the heat losses of the current feed, of the electrical equipment (not shown) connected to the current feed via the superconductive wire 4 and of other elements of the cryogenic installation. This vapor enters the tube 2A through apertures 5 at the perimeter of its lower end. The weld joining the conductor 1 and the solid conductive part 28 to which the wire 4 is welded must not obstruct the lower end of the strip.

The tube 2A is made from glassfiber-reinforced epoxy resin, for example. The tube 2B is made from a metal that is a good conductor of heat. A metal (copper, for example) washer 18 provides continuity between the parts 2A and 2B and is welded to the intermediate part of the strip to form an electrical contact at this location.

The upper part of the current feed includes a connecting terminal 7 including an axial blind hole to the bottom of which is welded the upper end of the strip 1 to provide electrical continuity. The wall of the blind hole of the terminal 7 includes holes 30 opening into an annular chamber 31 formed within the head 32 of the current feed. The head 32, which may be made from epoxy resin, also includes an orifice 33 connecting the annular chamber 31 to a pipe 6 fixed to the head. The part of the strip inserted in the terminal 7 includes radial holes 34. The interior of the strip therefore communicates with the pipe 6 through the holes 34 and 30, the annular chamber 31 and the orifice 33. The lower part of the strip, that is to say the part in corresponding relationship to the element 2A of the sealed tube, also includes holes so that the cryogenic fluid vapor can enter the interior of the strip.

The head 32 is used to fix the current feed to the tank containing the cryogenic fluid and the electrical equipment to be connected and also supports the terminal 7 by means that are not shown.

The cryogenic fluid vapor heated to a temperature near ambient temperature as the result of heat exchange with the conductor 1 is exhausted or returned to a liquefier by the pipe 6. The hot end of the current feed is connected to the ambient temperature electrical circuit by the ambient temperature connecting terminal 7 which has low electrical and thermal resistance.

The sealed tube 2B is surrounded by an insulative enclosure 35 made from epoxy resin, for example, to constitute a cooling passage 9 in which are preferably provided fins 11, 12 fixed to the tube 2B and promoting the exchange of heat. Made from a metal that is a good conductor of heat, such as copper, these fins can be welded to the metal tube 2B.

An external insulative enclosure 8, fixed in its upper part to the head 32 by adhesive bonding, for example, surrounds the current feed as far as the metal washer 18. The bottom part of the enclosure 8 is adhesively bonded to the tube 2A by an annular bead of Araldite or other epoxy resin adhesive 36. The tube 2A and the enclosures 8 and 35 have tight sliding fit common surfaces with the washer 18 which provides a good seal and enables the metal part to expand or contract relative to the insulative parts without causing problems.

The enclosures 8 and 35 delimit an annular space which is separated into two passages 14 and 17 by longitudinal partitions 19 that can be seen in FIG. 3. The partitions 19 run the full length of the enclosure 35 which has apertures 37 in its perimeter at the lower part, the passages 9 and 14 communicating at this level.

The passage 14 is connected to an inlet pipe 13 for dry air at a temperature only slightly above ambient or for another fluid such as nitrogen. The pipe 13 is fixed to the head 32 which has a chamber 38 communicating with the channel 14 and via an orifice 39 with the pipe 13. Connected at the lower end to the passage 14, the passage 19 is used to cool the current feed when it is carrying a high current.

The outlet pipe 15 is connected to the passage 9 by the annular chamber 40 and the orifice 41 machined in the head 32.

As shown by the arrows in FIG. 1, when a high current is flowing the cooling air or fluid descends the passage 14 to a first level 14A, rises through the passage 9 along the fins and then exits via the pipe 15 to be exhausted or recycled after exchanging heat with the surrounding environment.

The passage 17 is connected to an inlet pipe 16 for dry air (or another fluid) at a temperature only slightly above ambient temperature. This air is used to cool the current feed when it is carrying the nominal current. On the side of the passage 17 the enclosure 35 is interrupted at the level 17A. As shown by the arrows, the cooling fluid descends in the passage 17 to a second level 17A higher than the first, rises through the passage 9 in contact with the fins 12 and then exits via the tube 15 to be exhausted or recycled.

The passage 17 may be interrupted by means of a half-ring-shape transverse partition 10.

As shown in the diagram, the transverse cross-section of the conductor is preferably larger in the area nearer the very low temperature environment (2A) than in the area further away therefrom (2B).

FIG. 4 shows for a current feed 1.2 m long with an outside diameter of 100 mm, of the type shown in FIGS. 1 through 3, designed to carry a current up to 3000 amperes and using helium as the cryogenic fluid, the observed thermal losses P (expressed in Watts at 4.2K) as a function of the current I in the current feed:

a) with no cooling by an auxiliary air circuit (curve A); the consumption is 0.12 Watts at 4.2 K for zero current;

b) with cooling by the auxiliary air circuit 16 - 17 - 9 - 15 only, when the current feed is carrying the nominal current (curve B); the consumption is 1.17 Watts at 4.2 K for a current of 1000 amperes;

c) with cooling over all of the height of the enclosure around the current feed by both auxiliary air circuits 13 - 14 - 9 - 15 and 16 - 17 - 9 - 15 when the current feed is carrying a current higher than the nominal current (curve C); the consumption is 2.58 Watts at 4.2K for a current of 2000 amperes.

By way of comparison, a known current feed designed to carry 2000 amperes with no enclosures for circulation of an auxiliary cooling fluid has losses under no load conditions of around 1.2 W at 4.2K, which is six times greater than a current feed in accordance with the invention.

When there is satisfactory exchange of heat between the auxiliary cooling fluid and the current feed, heat losses as a result of the Joule effect in the section cooled by the auxiliary fluid have no effect on the consumption to maintain the very low temperature and are very small. The energy consumption accounted for by circulating the auxiliary fluid is also very small.

In the alternative embodiment shown in FIG. 5 the cooling gas is the cryogenic fluid vapor from the bath 4 after heating slightly above ambient temperature by exchange of heat with the current feed. The vapor is cooled to ambient temperature in an air-cooled heat exchanger 20 and then recycled by means of circulators 21, 22 through pipes 23, 24.

In this case it is no longer necessary to dispose auxiliary gas circulation passages around the current feed, the recycled cryogenic fluid being able to flow with the vapor from the liquid bath inside a sealed tube containing the conductor.

The method in accordance with the invention therefore selects according to the current carried by the current feed the level at which the auxiliary cooling fluid is caused to exchange heat with the conductor. The part of the current feed above the level at which the auxiliary cooling fluid is introduced is at approximately ambient temperature provided that the flowrate of this fluid and the rate at which it exchanges heat with the conductor are sufficient. The transition between ambient temperature and the very low temperature bath therefore occurs in the part of the current feed below the level at which the auxiliary cooling fluid is introduced. The length $L_i$ of this part of the current feed must be optimized as a function of the current $I_i$ to obtain the optimal resistance:

$$r_{opt} = I_i \int_o^{L_i} \frac{dl}{S(l)}$$

However, results are relatively good provided that the current I does not differ too greatly from the optimal value $I_i$ for materials whose electrical resistivity is relatively insensitive to temperature such as brass and some alloys, to the exclusion of very pure metals.

In the case of FIGS. 1 through 5, for example, the current feed is optimized for three values $I_0$, $I_1$, $I_2$ of the current that it carries according to whether there is no circulation of auxiliary cooling fluid, this fluid circulates from the level 17A or this fluid circulates from the level 14A. Under no load conditions, with no cooling by the auxiliary fluid, the heat losses are reduced to those of a current feed optimized for the no-load current $I_0$, or even less if mechanical unplugging is also employed.

There is claimed:

1. Device for cooling an electrical current feed between a terminal at ambient temperature and an electrical equipment immersed in a cryogenic fluid, the equipment being adapted to operate at variable electrical current, the cooling being obtained by circulating an auxiliary cooling fluid at ambient temperature within an electrical current feed and exchanging heat therewith, by introducing the auxiliary cooling fluid at an intermediate level within the current feed when the electrical current exceeds a particular threshold, and introducing at least some of the auxiliary cooling fluid at other levels nearer the electrical equipment at higher electrical current, said device comprising: a first enclosure for surrounding an electrical current feed and delimiting a first passage for circulation of said auxiliary cooling fluid in thermal contact with said current feed; means for admitting at lest some of said cooling fluid into said first passage at a level selected according to the level of electrical current carried by said current feed; a second enclosure around said first enclosure defining a space therebetween for circulating said auxiliary cooling fluid; and means for separating said space into a second passage and a third passage, each of which has access to said first passage at a different level.

* * * * *